Dec. 15, 1970  G. R. HALL  3,548,164
COUNTER MECHANISM AND TEST APPARATUS
Filed April 3, 1967
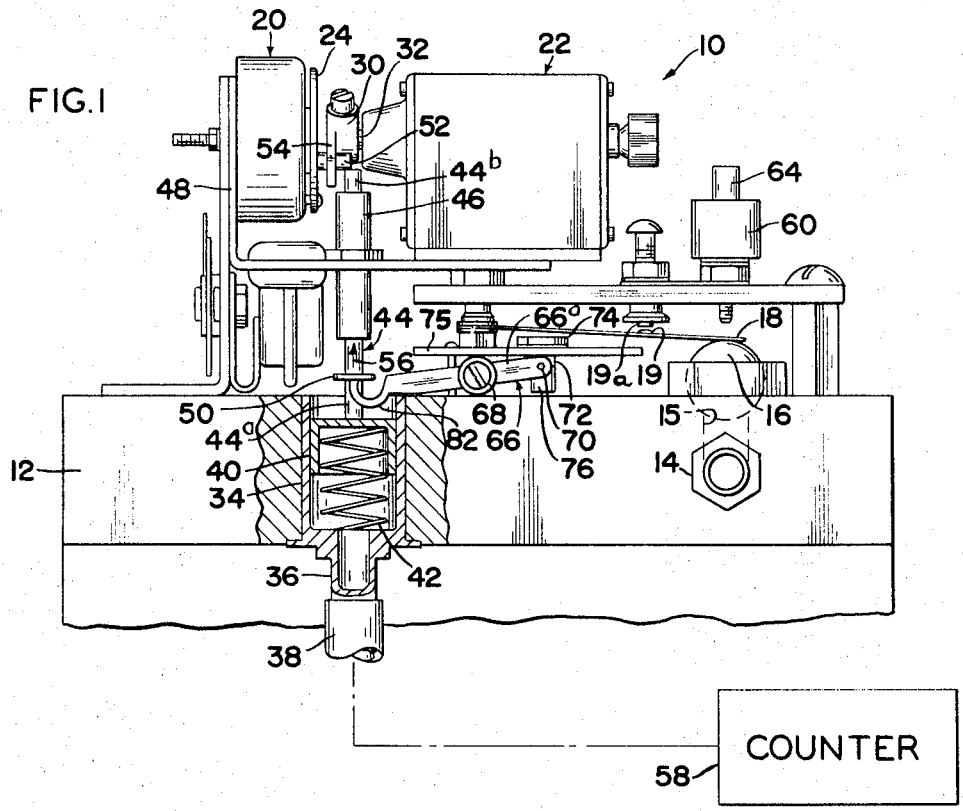
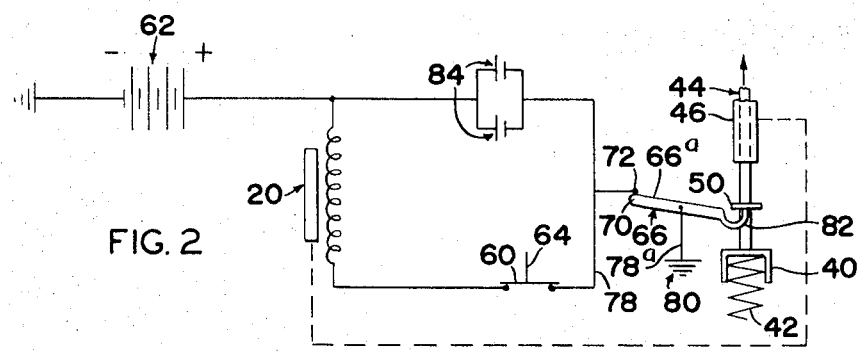
INVENTOR.
GLEN R. HALL
BY
Oldham & Oldham
ATTYS.

__United States Patent Office__

3,548,164
Patented Dec. 15, 1970

3,548,164
COUNTER MECHANISM AND TEST APPARATUS
Glen R. Hall, 326 W. 3rd St., Uhrichsville, Ohio 44683
Filed Apr. 3, 1967, Ser. No. 627,790
Int. Cl. G06m 1/12
U.S. Cl. 235—92                               12 Claims

ABSTRACT OF THE DISCLOSURE

A counter mechanism and test apparatus having an air pump such as an air cylinder with a piston slidable therein, which piston is reciprocated back and forth in the air cylinder each time a magnetic coil is actuated to effect operation of a counter unit. The reciprocating piston creates an air pulse each time the magnetic coil is actuated, the air cylinder being adapted for connection to a separate mechanism to be tested which can be actuated by the air pulse.

---

This application should be cross referenced with U.S. Pats. Nos. 2,639,093; 2,547,937 and 2,403,277.

This invention relates to a controlled impulse counter mechanism intercorporating apparatus whereby such counter mechanism can be used to test other counter mechanism of the controlled impulse type. Basically, the apparatus incorporated into the controlled impulse counter mechanism test apparatus is an air pump such as an air cylinder and piston means slidably received in the air cylinder, means for rapidly but controllably reciprocating the piston means in the air cylinder in order to create a series of air pulsations in the air cylinder, means for counting the number of air pulsations created in the air cylinder means, and means for directing the counter air pulsations to the controlled impulse counter mechanism to be tested wherein it can be determined if the counter mechanism to be tested is correctly registering on its counter unit each incoming air pulse.

In order to obtain a better understanding of the counter mechanism and test apparatus of the invention, reference should be had to the accompanying drawing wherein:

FIG. 1 is a side elevation of a preferred embodiment of the counter mechanism and test apparatus of the invention, with the air cylinder and piston means incorporated therein being shown in cross section, the air cylinder also diagrammatically shown as being connected to a counter mechanism to be tested; and FIG. 2 is a schematic and diagrammatic illustration of the wiring system of the apparatus of FIG. 1.

The counter mechanism and test apparatus, generally indicated by the numeral 10, is of the controlled impulse type disclosed by U.S. Pats. Nos. 2,639,093; 2,547,937 and 2,403,277, wherein the counter mechanism is adapted to be actuated by an incoming impulse of air. For example, a tube, not shown, is adapted to be secured to suitable input valve, or fitting 14 which is provided on a base 12 of the apparatus. The input 14 connects with suitable air chamber 15 which is capped by a sphere or ball 16. Since the controlled impulse type counter mechanism illustrated by FIG. 1, is, for example, utilized to check and record the count of vehicular traffic over a certain stretch of highway or road, the tube adapted to be connected to the fitting 14 is normally stretched across the particular road on which the count of vehicular traffic is to be made. As the vehicle passes over the tube attached to fitting 14, the force of the vehicle striking the tube as it passes thereover will create a sudden air impulse which will cause the ball 16 to be raised off of the air chamber connecting to the fitting 14. The force of the air pulsation pushing the ball 16 upwardly will cause it to move reed switch 18 bearing thereagainst. Such movement of the reed switch 18 brings a contact 19 thereon into engagement with an associated contact 19a to close a circuit between a magnetic coil and a suitable storage battery in order to actuate a magnetic coil 20. The magnetic coil is operatively connected to a conventional counter mechanism 22 whereby the action of the magnetic coil effects operation of the counter unit to register one digit or counting unit.

The magnetic coil 20, preferably of the type as described and illustrated in U.S. Pat. 2,496,880, is provided with an end disc or plate 24 which is moved arcuately and an axial distance upon actuation of the magnetic coil 20. As the magnetic coil 20 is de-energized, suitable spring means provided in the magnetic coil return the disc 24 to its original, or unactuated position. Mounted on the disc 24 is a suitable pin or shaft 52 connected to a lever, or connector 30 which is connected to a drive shaft 32 of the counter 22. Thus, when the magnetic coil 20 is actuated, lever 30 and drive shaft 32 also rotate with the disc 24 in order to register one digit on the counter unit 22. The magnetic coil illustrated is produced by Ledex, Inc., of Dayton, Ohio, and the counter 22 is manufactured by Veeder-Root, Inc., of Hartford, Conn.

It is the basic feature of the present invention to incorporate into the known elements of the counter mechanism described above apparatus which will allow the counter mechanism to be independently used to test other counter mechanisms of the controlled impulse type. Basically, this is accomplished by positioning an air pump, in this instance an air cylinder 34, in the base 12. The air cylinder 34 is connected by a conduit 36 to a suitable flexible tube 38 which is secured in airtight relationship to the conduit 36. The flexible tube 38, for reasons which will become apparent as the description proceeds, is adapted to be connected to suitable input means of the controlled impulse counter mechanism to be tested usually identical with the apparatus described hereinbefore. Actually, such input means will be substantially the same as the fitting 14 illustrated in FIG. 1.

Slidably received within the air cylinder 34 in substantially fluid-tight relationship therewith, is a piston 40. As illustrated by FIG. 1, the piston is cupped-shaped with the open end of the cup extending downwardly into the air cylinder 34. Received within the cup and bottomed on the base of the air cylinder 34 is a suitable compression spring 42 which tends to force the cupped-shaped piston 40 upwardly of the air cylinder 34.

Tending to retain the piston 40 in the air cylinder 34, however, is a suitable connector rod or piston rod 44 which is slidably received in a sleeve 46 that is secured, for example, to bracket means 48 which are mounted to the base 12 and which provide support for the magnetic coil 20 and the counter unit 22, as well as for sleeve 46. The piston rod or connector rod 44 may be comprised of two independent sections, 44a and 44b, with the rod section 44a being secured to the base of the cupped-shaped piston 40 and extending axially upwardly therefrom. Rod 44b is in alignment with the rod 44a and forms an extension thereof. As is seen by FIG. 1, the upward or top end of rod 44b operatively engages with the pin 52 which is mounted in perpendicular relationship to and engages a radially directed arm 54 formed integral with the hub or lever 30. The lower end or downward end of the rod 44b is provided with an annular flange 50 which allows the piston rod 44a to seat thereon.

The purpose of such connector rod 44 is to effect an operative connection of the piston 40 with the disc 24 of the magnetic coil 20 whereby actuation of the magnetic coil 20 causes piston 40 to be slidably moved in air cylinder 34. Such operation becomes evident when it is realized that upon actuation of the magnetic coil 20, arm 54 and pin 52 arc upwardly and away from the sleeve 46. As such occurs, compression spring means 42 forces the piston 40 and connector rod 44 upwardly in the direction of arrow 56 so that the top end of rod 44b remains biased against pin 52. Of course, the arc of pin 52 is not sufficiently great that the top end of the rod 44b slips out of operative engagement therewith, but instead the end stays biased against the pin 52 during its permitted arcuate movement.

As the magnetic coil 20 is actuated, the piston means 40 moves axially outwardly in the air cylinder 34, as explained above. When, however, magnetic coil 20 is de-energized, the helical spring or equivalent means (not shown) provided in the magnetic coil 20 will cause the arm 54 and pin 52 to snap back to their original positions quickly. As such occurs, the force of compression spring means 42 will be overcome and connector rod 44, still biased against pin 52, pushes the piston 40 axially inwardly into air cylinder 34. As the quick axial movement of the piston 40 back into air cylinder 34 occurs, an air pulsation or impulse will be forced out of the conduit 36 and into flexible tube 38. As mentioned hereinbefore, flexible tube 38 is adapted to be connected to the input of a counter mechanism 58 which is to be tested. If after the cycle described above occurs, counter unit 58 registers an additional digit, it is working properly.

As explained hereinbefore, magnetic coil 20 is actuated when reed switch 18 is closed by being forced upwardly by ball 16. It becomes desirable, however, when the counter mechanism 10 is being used solely as a device for testing other controlled impulse counter mechanisms, to actuate the magnetic coil 20 independently of the reed switch 18. This is accomplished by providing a normally open switch 60 which connects the magnetic coil 20 to battery 62 (shown diagrammatically in FIG. 2) so that when switch 60 is pushed to a closed position by a plunger 64 the magnetic coil 20 will be actuated. As plunger 64 is pushed in to close switch 60, the magnetic coil 20 is actuated to effect rotation of drive lever 30 of counter unit 22 in order to register an additional digit thereon. At the same time, the arcuate movement of arm 54 will allow connector rod 44 to slide axially upwardly so that the piston 40 will slide outwardly of the air cylinder 34. As plunger 64 is released, magnetic coil 20 is de-energized resulting in a downward movement of piston 40, whereby an air pulsation is forced into flexible tube 38. As such occurs, the counter mechanism 58, if working properly, should register an additional digit on its counter unit.

As can be seen from the above description, although counter unit 22 will register an additional digit upon actuation of magnetic coil 20, it is necessary to de-energize the magnetic coil 20 before piston 40 is forced downwardly into the air cylinder to create a pulsation whereby an additional digit will register on counter unit 58. In order to provide for a rapid energization and de-energization of magnetic coil 20 without having to release plunger 64, a make-break switch generally indicated by the numeral 66 is included in the counter mechanism and test apparatus of the invention. The make-break switch, generally indicated by the numeral 66 includes a conductive arm 66a which is provided with a conductive pivotal mounting 68 at substantially the center thereof and a contact point 70 is provided on one end thereof. When the magnetic coil 20 is de-energized, the contact point 70 connects with an annular contact ring 72 mounted on a post 74 and insulated from the base 12 by a suitable insulating mount or arm 75 and a sleeve 76. A suitable lead 78 connects contact ring 72 to the switch 60 and suitable lead 78a connects pivotal mounting 68 to ground 80. The other end of the make-break switch 66 is provided with an end or hook 82 which catches on the annular flange 50 provided on connector bar 44.

When the magnetic coil 20 is de-energized, contact point 70 of make-break switch 60, as illustrated by FIGS. 1 and 2, contacts with annular contact ring 72. Upon actuation of magnetic coil 20, however, by closing switch 60, the base of piston 40 as it slides upwardly in air cylinder 34 strikes the hook portion on the other end of the make-break switch 60 to pivot the make-break switch wherein contact point 70 slides off contact ring 72. As such occurs, as can be best seen from FIG. 2, the connection of switch 60 to ground 80 through the mounting 68 is broken whereby magnetic coil 20 is de-energized. As the magnetic coil is de-energized, however, the spring means provided therein forces arm 54 back to its original position whereby connector rod 44 is slid axially downwardly in sleeve 46. As such occurs, the annular flange 50 provided thereon engages with hook 82 provided on the other end of make-break switch 66 wherein the make-break switch 66 is pivoted back to its original position. As such occurs, contact point 70 again slides into contact with annular contact ring 72 to again energize coil 20 whereby the cycle is repeated if the switch 60 is closed.

Such rapid energization and de-energization of the magnetic coil 20 caused by the pivotal movement of the make-break switch 66 results in a series of rapid reciprocations of the piston 40 within the air cylinder 34. Such rapid reciprocations of the piston 40 force a series of air pulsations into flexible tube 38 which should be registered by the counter mechanism 58. Such an arrangement allows the counter mechanism 58 to be rapidly and quickly tested by simply pressing down plunger 64 of the switch 60 in order to close the circuit illustrated by FIG. 2.

Timing means, such as a pair of condensors 84, connected in parallel, are provided in the circuit illustrated by FIG. 2 to insure regulated and timed actuation of the magnetic coil 20 under test conditions. U.S. Public Roads, Washington, D.C., require in their specifications that for accurate traffic counting in multiple lanes that a traffic counter to meet their specifications must exceed 800 counts per minute. Hence each time the contact point 70 moves onto the contact ring 72 a charge buildup in the condensors 84 will provide a regulated and timed pulse of current to the magnetic coil 20. The contact point 70 is moved away from the contact ring 72 by the action of the piston 40 upon magnetic coil energization to thus break the circuit to ground 80 and de-energize the magnetic coil 20. As the condensors 84 rapidly recharge from the battery or batteries 62, the test apparatus 10 will rapidly cycle automatically as long as the switch 60 is held closed (over 800 counts per minute).

The combination of the test apparatus incorporated into the counter mechanism 10 provides an improved counter mechanism which not only functions independently as a counter mechanism but can also be used to test similar counter mechanisms of the controlled air impulse type. The counter mechanism is quickly and easily converted to a test apparatus by simply disconnecting the flexible tube connected to input 14 and using a short tube to connect air cylinder 34 to the input means of the counter mechanism to be tested. Then all that needs to be done is to simply close switch 60 to create a series of air pulsations which will be directed to the counter mechanism to be tested. Of course, since each air pulsation which will be directed to the controlled impulse counter to be tested will be registered on the counter unit of the test device, such counter mechanism tested can be determined to be operating properly if the same number of digits register on the counter unit of the mechanism to be tested as on the counter unit of the testing device, assuming, of course, that both of such counters are set at zero, or the same figures before such test is made.

It should be understood that although the present disclosure refers to test apparatus for a counter mechanism of the controlled impuse type where the solenoid or magnetic coil is energized to actuate an air pump, it is not difficult to visualize apparatus of a similar type whereby the magnetic coil upon energization actuates or provides an electric or magnetic impulse such as created by an ultrasonic sound wave, radar, a light beam, or the like, which electric impulses are utilized to activate counting devices activated and/or controlled by the so created impulse. Accordingly, substantially the same type of mechanism as disclosed herein could be incorporated into counter mechanisms not of the air impulse type in order to provide such counter mechanisms with test apparatus for testing, for example, all types of traffic counters.

While in accordance with the patent statutes only one best known embodiment of the invention has been illustrated and described in detail, it is to be particularly understood that the invention is not limited thereto or thereby but that the inventive scope is defined in the appended claims.

What is claimed is:

1. A counter mechanism and test apparatus comprised of
   a counter unit, a magnetic coil, means connecting said magnetic coil to said counter unit, and means for actuating said magnetic coil whereupon action of the magnetic coil effects operation of the counter unit to register one digit, wherein the improvement comprises
   air pump means, including a movable member, means operatively connecting said movable member to said magnetic coil whereupon actuation and release of said magnetic coil effects movement of said member in said air pump means to create an air pulsation, means for connecting said air pump means to a counter mechanism actuated by an air pulsation whereby each time said magnetic coil is actuated and released to effect operation of said counter unit a pulse of air is directed to the counter mechanism to be tested whereupon the number of air pulsations received and registered by the counter mechanism to be tested can be checked against said counter unit to determine if the counter mechanism to be tested is functioning properly.

2. The combination according to claim 1 wherein said air pump means is an air cylinder and wherein said movable member is a piston means slidable in fluid tight relation in said air cylinder.

3. The combination according to claim 2 wherein the means operatively connecting said piston means to said magnetic coil are a piston rod connected to said piston means, and spring means positioned in said air cylinder means biasing said piston rod against an arcuately moved portion of said magnetic coil.

4. The combination according to claim 3 wherein actuation of said magnetic coil causes a portion of said magnetic coil to be moved an arcuate distance away from said piston rod whereby said spring means forces said piston means outwardly in said air cylinder, and wherein said magnetic coil has spring means therein which arc said arm back to its original position upon de-energization of said magnetic coil thereby forcing said piston means inwardly in said cylinder to create an air pulsation.

5. The combination according to claim 3 and including switch means actuating said magnetic coil, breaker switch means operatively connected to said magnetic coil wherein actuation of the magnetic coil effects movement of said breaker switch means to de-energize said magnetic coil, and spring means moving said breaker switch means upon deenergization of said magnetic coil to reactuate said magnetic coil.

6. The combination according to claim 5 wherein said breaker switch means is conductive and has a pivotal mounting connected to ground, one end of said switch means being operatively connected to said piston rod whereby reciprocation of said piston rod effects movement of the other end of said breaker switch means off and then back on a contact point that is connected to said switch means actuating said magnetic coil.

7. The combination according to claim 5 and including condensor means connected to said magetic coil and to said breaker switch means to provide a regulated or timed pulse of current into the magnetic coil each time said breaker switch means is moved back on said contact point.

8. A counter mechanism and test apparatus comprised of
   a counter unit, a magnetic coil, means connecting said magnetic coil to said counter unit, and means for actuating said magnetic coil whereupon action of the magnetic coil effects operation of the counter unit to register one digit, wherein the improvement comprises
   impulse generation means, including a movable member, means operatively connecting said movable member to said magnetic coil whereupon actuation and release of said magnetic coil effects movement of said movable member to effect operation of said impulse generation means whereby an impulse is created, and means for connecting said impulse generation means to a counter mechanism actuated by a said impulse whereby each time said magnetic coil is actuated and released to effect operation of said counter unit an impulse is directed to the counter mechanism to be tested whereupon the number of pulsations received and registered by the counter mechanism to be tested can be checked against said counter unit to determine if the counter mechanism to be tested is functioning accurately.

9. An apparatus comprised of a counter unit, a magnetic coil having a movable member controlled thereby and a return means operatively connected to such movable member, means connecting the movable member of said magnetic coil to said counter unit, and means for actuating said magnetic coil whereupon action of the magnetic coil effects operation of the counter unit to register one unit, a control circuit including switch means for actuating said magnetic coil, breaker switch means operatively connected in said circuit and operatively engaging said movable member, actuation of the magnetic coil effecting opening movement of said breaker switch means to de-energize said magnetic coil, said return means moving said breaker switch means upon de-energization of said magnetic coil to a closed position to reactuate said magnetic coil, and impulse generating means operatively connected to said magnetic coil and adapted for connection to a second unit to be actuated upon each cycle of energization of said magnetic coil.

10. The combination according to claim 9 wherein said breaker switch means comprises a conductive pivotally mounted arm connected to ground, one end of said switch means being operatively connected to said impulse generating means, and a contact member in said control circuit connected to a portion of said arm only when said magnetic coil is de-energized to complete an actuation circuit therefor.

11. An apparatus comrised of
    a counter unit,
    a magnetic coil,
    means connecting said magnetic coil to said counter unit,
    means for actuating said magnetic coil; and whereupon action of the magnetic coil effects operation of the counter unit to register one unit, and
    impulse generation means, including a movable member, means operatively connecting said movable member to said magnetic coil whereupon actuation and release of said magnetic coil effects movement of said movable member to effect operation of said impulse generation means whereby an impulse is created, and means for connecting said impulse generation means to a mechanism actuated by a said impulse whereby each time said magnetic coil is actuated and released an impulse is directed to said mechanism.

12. An apparatus as in claim 11 where said magnetic coil has a movable means thereon with energized and non-energized positions and is automatically returnable to its non-energized position, said movable member operatively engaging said movable means.

References Cited
UNITED STATES PATENTS

| | | | |
|---|---|---|---|
| 2,403,277 | 7/1946 | Hall | 60—62.5 |
| 2,547,937 | 1/1951 | Hall | 235—92 |
| 2,639,093 | 5/1953 | Hall | 235—92 |
| 3,323,721 | 6/1967 | Topfer et al. | 235—201 |
| 3,371,863 | 3/1968 | Bickford et al. | 235—201 |

OTHER REFERENCES

T. H. van den Honert: "Pneumatic Oscillator," IBM Tech. Disclosure, vol. 7, No. 6, November 1964, pp. 462, 463.

MAYNARD R. WILBUR, Primary Examiner

J. M. THESZ, JR., Assistant Examiner

U.S. Cl. X.R.

235—201